(12) United States Patent
Yannuzzi et al.

(10) Patent No.: US 12,225,052 B2
(45) Date of Patent: Feb. 11, 2025

(54) COMPLIANT DATA TRANSFERS

(71) Applicant: Cisco Technology, Inc., San Jose, CA (US)

(72) Inventors: Marcelo Yannuzzi, Vufflens-la-Ville (CH); Benjamin William Ryder, Lausanne (CH); Jean Andrei Diaconu, Haute-Savoie (FR); Hervé Muyal, Gland (CH); Hitesh S. Saijpal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 17/877,989

(22) Filed: Jul. 31, 2022

(65) Prior Publication Data
US 2024/0039959 A1 Feb. 1, 2024

(51) Int. Cl.
*H04L 9/40* (2022.01)
*H04L 67/10* (2022.01)

(52) U.S. Cl.
CPC .............. *H04L 63/20* (2013.01); *H04L 67/10* (2013.01)

(58) Field of Classification Search
CPC ................................ H04L 63/20; H04L 67/10
See application file for complete search history.

(56) References Cited

U.S. PATENT DOCUMENTS

| | | | |
|---|---|---|---|
| 9,949,129 | B1 | 4/2018 | Henry et al. |
| 10,601,787 | B2 | 3/2020 | Pritikin et al. |
| 10,713,664 | B1 | 7/2020 | Alagappan et al. |
| 2005/0021689 | A1 | 1/2005 | Marvin et al. |
| 2009/0099860 | A1 | 4/2009 | Karabulut et al. |
| 2014/0032724 | A1 | 1/2014 | Sabin et al. |
| 2014/0222522 | A1 | 8/2014 | Chait |
| 2014/0280961 | A1 | 9/2014 | Martinez et al. |
| 2015/0281287 | A1 | 10/2015 | Gill et al. |
| 2016/0330248 | A1 | 11/2016 | Zhang et al. |
| 2016/0344736 | A1 | 11/2016 | Khait et al. |
| 2017/0170970 | A1 | 6/2017 | Leighton et al. |
| 2017/0201569 | A1 | 7/2017 | Fu et al. |
| 2017/0300309 | A1 | 10/2017 | Berger et al. |
| 2018/0027022 | A1 | 1/2018 | Nagaratnam et al. |
| 2018/0124066 | A1 | 5/2018 | Minkovich et al. |
| 2018/0124113 | A1 | 5/2018 | Lock et al. |
| 2018/0260566 | A1 | 9/2018 | Chaganti et al. |

(Continued)

OTHER PUBLICATIONS

"Global Apps, Local Compliance", online: https://incountry.com/, accessed May 24, 2022, 10 pages.

(Continued)

*Primary Examiner* — Baotran N To
(74) *Attorney, Agent, or Firm* — BEHMKE INNOVATION GROUP LLC; James M. Behmke; James J. Wong

(57) ABSTRACT

In one embodiment, a device may determine a compliance status of a communication of a type of data between a first workload and a second workload based on a data compliancy policy and a verified node location of at least one of the first workload and the second workload. The device may send, based on the compliance status of the communication, an instruction for handling the communication to at least one of a node executing the first workload and a node executing the second workload.

20 Claims, 9 Drawing Sheets

(56) References Cited

U.S. PATENT DOCUMENTS

| | | | |
|---|---|---|---|
| 2019/0014123 A1 | 1/2019 | Akireddy et al. | |
| 2019/0228171 A1 | 7/2019 | Mathur | |
| 2020/0050620 A1 | 2/2020 | Clark et al. | |
| 2020/0142735 A1 | 5/2020 | Maciocco et al. | |
| 2020/0202268 A1 | 6/2020 | Retna et al. | |
| 2020/0219111 A1 | 7/2020 | Nair et al. | |
| 2020/0293675 A1 | 9/2020 | Antonatos et al. | |
| 2020/0319907 A1 | 10/2020 | Jain | |
| 2020/0364351 A1 | 11/2020 | Sanchez et al. | |
| 2021/0006972 A1 | 1/2021 | Guim Bernat et al. | |
| 2021/0152561 A1 | 5/2021 | Shelton et al. | |
| 2021/0286638 A1 | 9/2021 | Fan et al. | |
| 2021/0329001 A1 | 10/2021 | Barton et al. | |
| 2021/0360037 A1* | 11/2021 | Beckman | H04L 63/20 |
| 2021/0365816 A1 | 11/2021 | Sears et al. | |
| 2022/0210196 A1* | 6/2022 | Parekh | H04L 63/0227 |
| 2024/0012911 A1* | 1/2024 | Yannuzzi | G06F 21/602 |
| 2024/0012918 A1* | 1/2024 | Yannuzzi | G06F 9/543 |
| 2024/0012921 A1* | 1/2024 | Yannuzzi | G06F 21/6218 |
| 2024/0012931 A1* | 1/2024 | Yannuzzi | G06F 21/51 |

OTHER PUBLICATIONS

"Global Cloud Service Provider", online: https://us.ovhcloud.com/, accessed May 24, 2022, 11 pages.

"Google Distributed Cloud", online: https://cloud.google.com/distributed-cloud, accessed May 24, 2022, 8 pages.

Kurian, Thomas, "How Google Cloud is addressing the need for data sovereignty in Europe in 2020", online: https://cloud.google.com/blog/products/identity-security/how-google-cloud-is-addressing-data-sovereignty-in-europe-2020, accessed May 24, 2022, 2 pages.

"Gaia-X: A Federated Secure Data Infrastructure", online: https://www.gaia-x.eu/, accessed May 24, 2022, 6 pages.

"RegTech 100", online: https://fintech.global/regtech100/, accessed May 24, 2022, 14 pages.

"OneTrust Cloud Solutions", online: https://www.onetrust.com/, accessed May 24, 2022, 5 pages.

"Collibra—The Data Intelligence Cloud", online: https://www.collibra.com/us/en, accessed May 24, 2022, 4 pages.

"LogicGate Risk Cloud", online: https://www.logicgate.com/, accessed May 24, 2022, 5 pages.

"Governance and Security for Low-Code/No-Code Applications", online: https://www.zenity.io//, accessed May 24, 2022, 6 pages.

Zacks, et al., "Network Data Objectivization, Classification, Verification and Privacy via Ring-Oriented Metadata", Defensive Publication Series, Jul. 2021, 11 pages, Technical Disclosure Commons.

Martinez, et al, "Ontology-Based Information Extraction from the Configuration Command Line of Network Routers," MIKE 2014, Lectures Notes in Artificial Intelligence, Springer, Cork, Ireland, Dec. 2014.

Martinez, et al., "An Ontology-Based Information Extraction System for bridging the configuration gap in hybrid SDN environments," 2015 IFIP/IEEE International Symposium on Integrated Network Management (IM), Jul. 2015, 9 pages, IEEE, Ottawa, ON, Canada.

"Secure Production Identity Framework for Everyone", online: https://spiffe.io/, accessed Jul. 27, 2022, 6 pages.

"Spire Concepts", online: https://spiffe.io/docs/latest/spire-about/spire-concepts/, accessed Jul. 27, 2022, 10 pages.

Pritikin, et al., "Bootstrapping Remote Secure Key Infrastructure (BRSKI)", Request for Comments 8995, May 2021, 116 pages, IETF Trust.

"Tetragon—eBPF-Based Security Observability & Runtime Enforcement", online: https://isovalent.com/blog/post/2022-05-16-tetragon/, May 16, 2022, accessed Jul. 27, 2022, 16 pages.

* cited by examiner

COMPLIANT DATA TRANSFERS

TECHNICAL FIELD

The present disclosure relates generally to compliant data transfers.

BACKGROUND

Applications operate by handling data. For instance, executing an application can involve the storage, communication, processing, etc. of various types of data. The various types of data may include data whose handling is subject to various regulations. For example, data handling regulations at national, federal, state, industry, and/or organizational levels may be applicable to the data handled by an application.

The enforcement of data compliance has only been made more complex and potential violations made more likely as applications are increasingly being developed as a set of distributed services running across a mix of multi-cloud and edge infrastructures, handling a mix of data types differentially subject to various regulations, and/or being utilized by mobile endpoints. Unfortunately, following deployment of an application, enforcement of data compliance requirements largely occurs non-specifically and in a programmatic blind-spot. Given the current regulatory environment and trends, continuing to treat data compliance as an afterthought in this manner will likely yield increased violations of data compliance regulations which may result in substantial fines, penalties, and/or other negative impacts to data handlers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
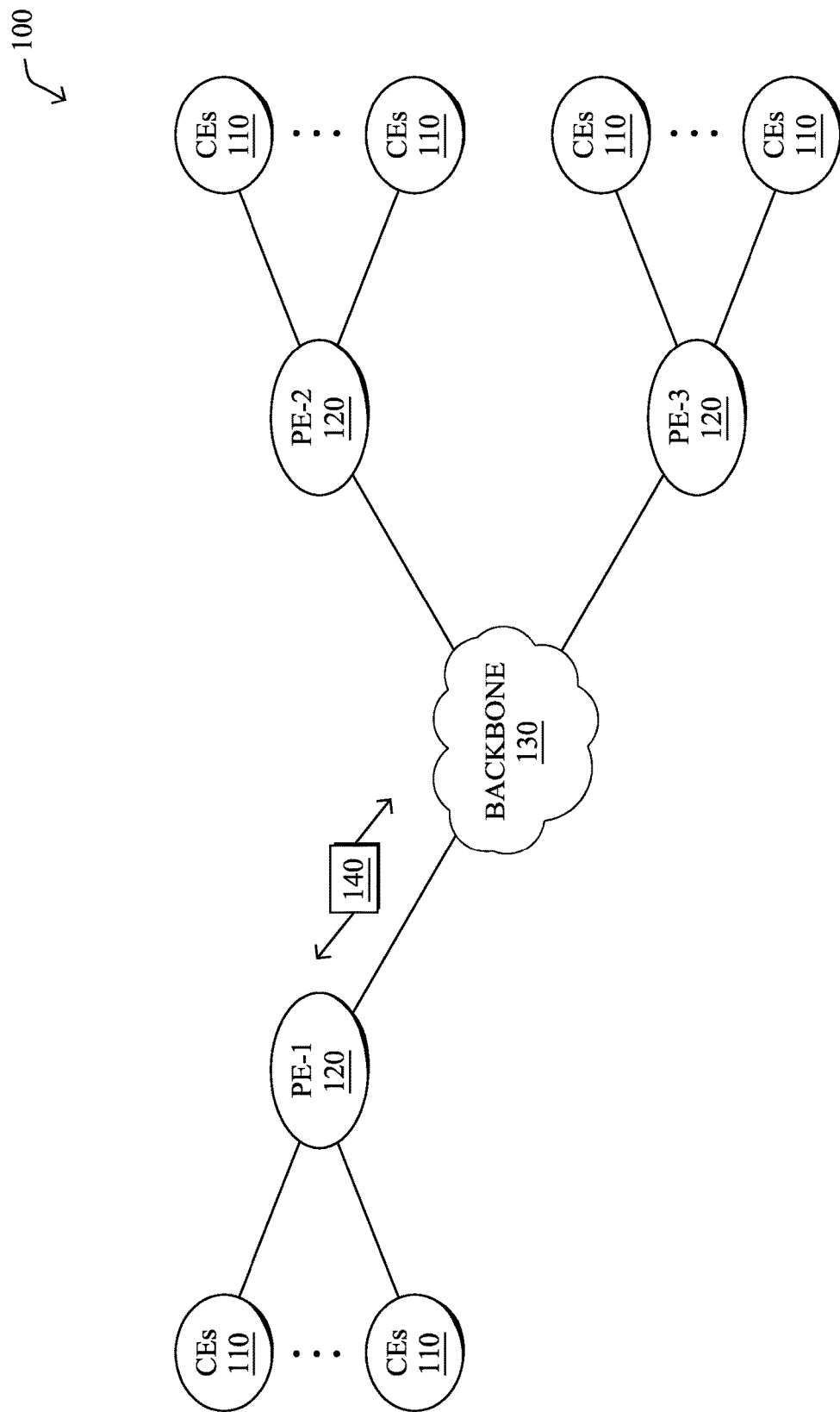
FIGS. 1A-1B illustrate an example communication network.

According to one or more embodiments of the disclosure, a device may determine a compliance status of a communication of a type of data between a first workload and a second workload based on a data compliancy policy and a verified node location of at least one of the first workload and the second workload. The device may send, based on the compliance status of the communication, an instruction for handling the communication to at least one of a node executing the first workload and a node executing the second workload.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
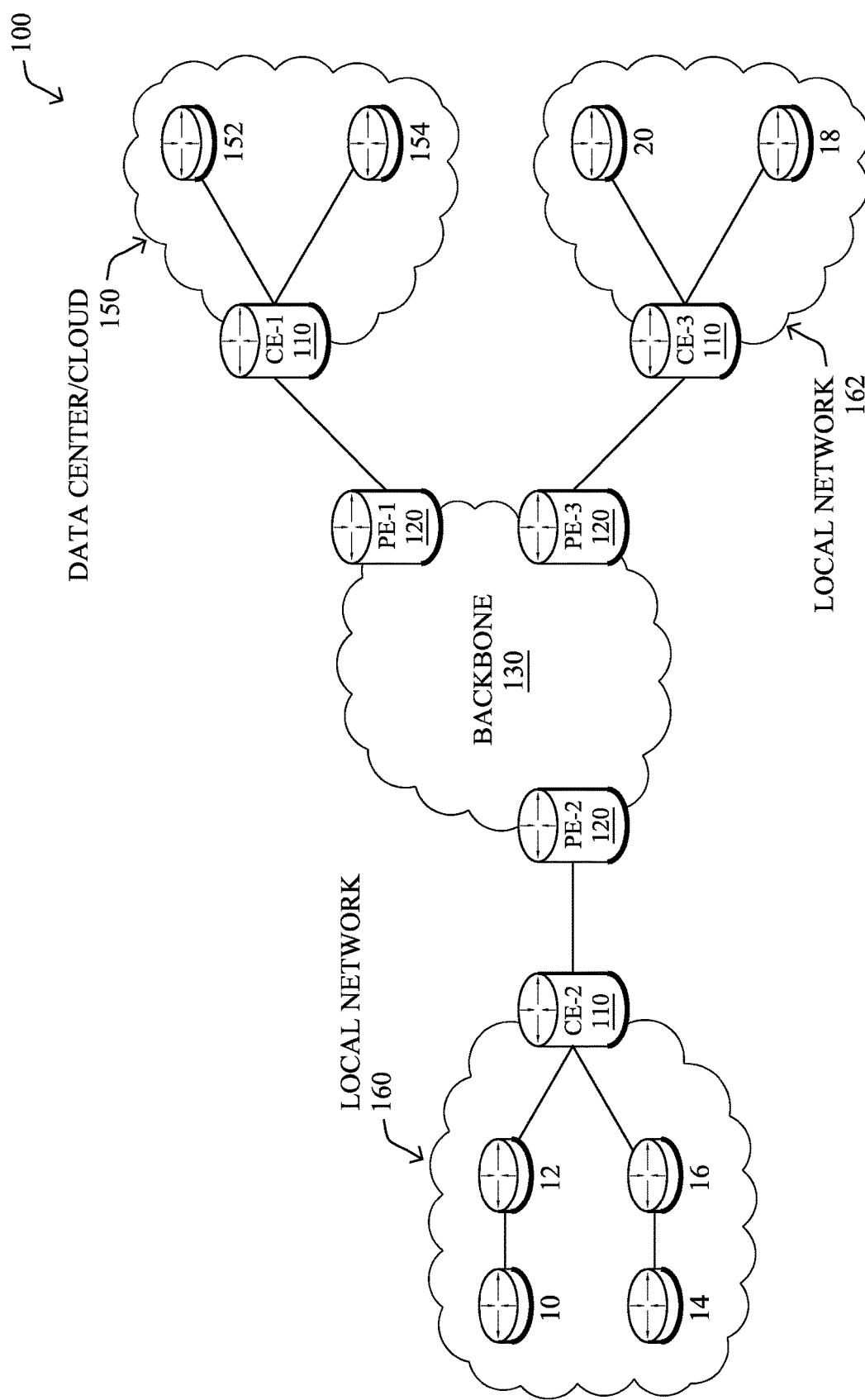

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
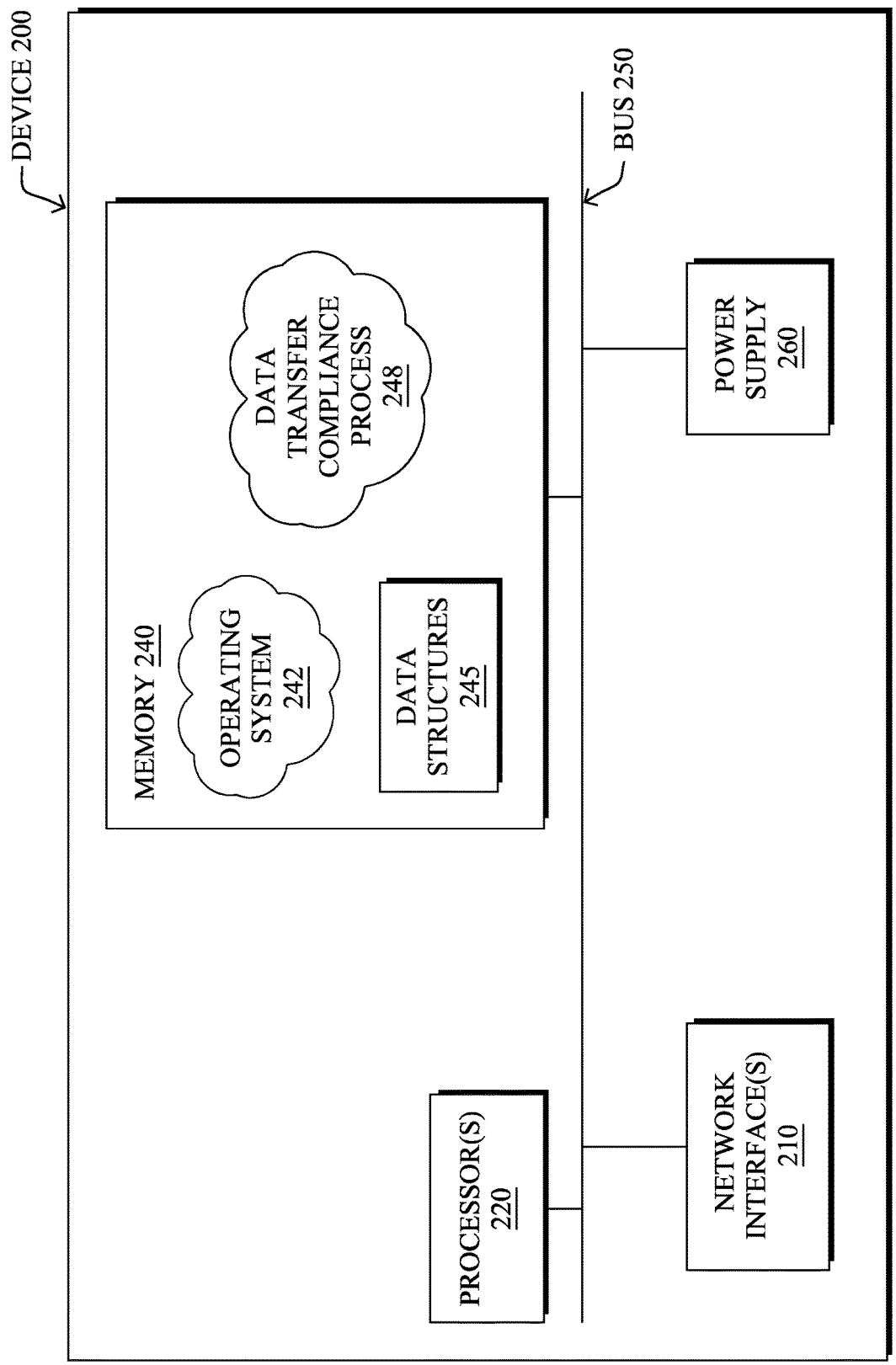
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise data transfer compliance process 248, as described herein, any of which may alternatively be located within individual network interfaces.

Figure 3:
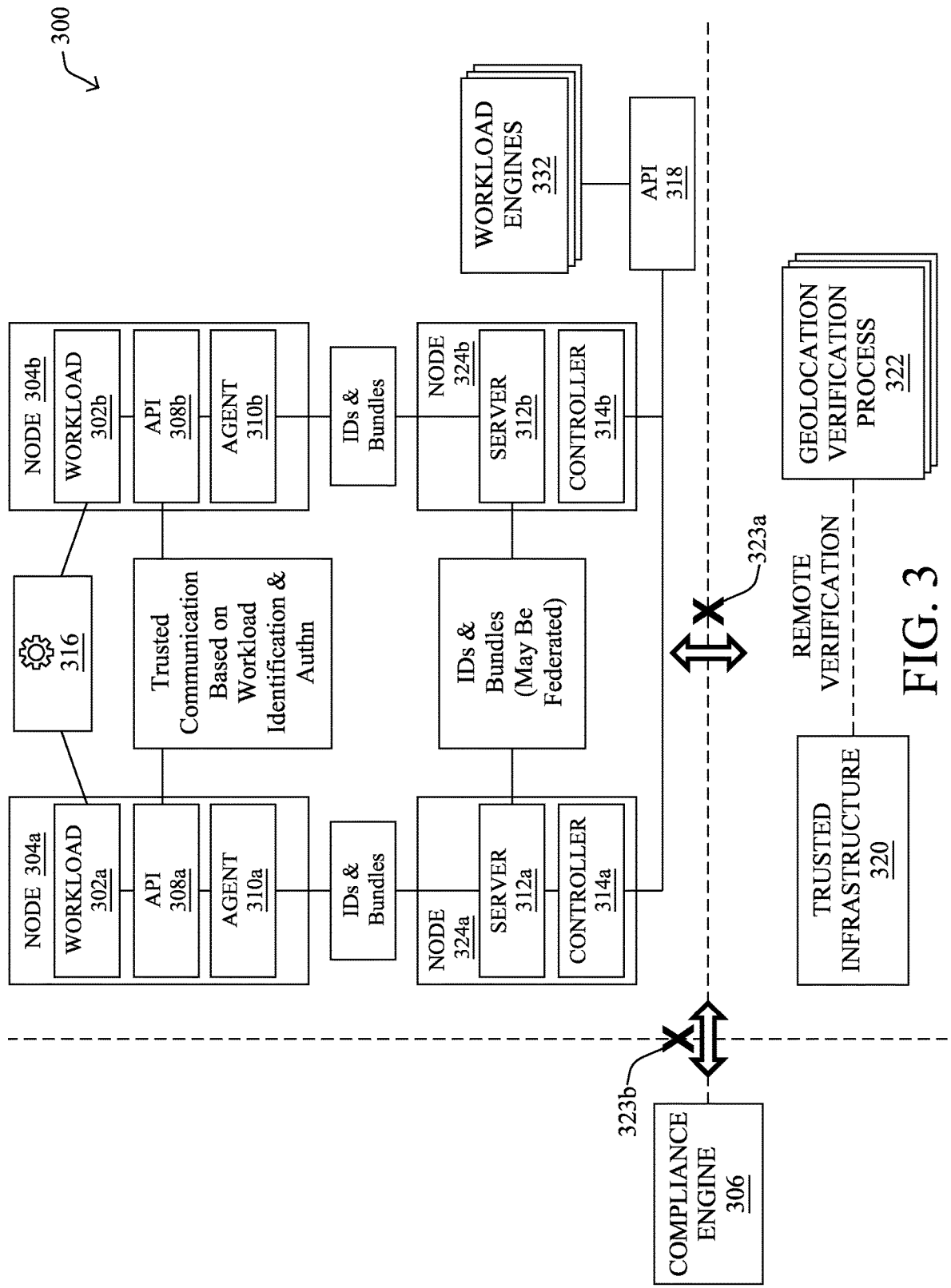
FIG. 3 illustrates an example architecture for data compliance.

FIG. 3 illustrates an example architecture 300 for data compliance according to various embodiments. Application 316 may be deployed, as are many modern applications, as a set of distributed workloads 302. For example, workloads 302 may be distributed among and run across various nodes (e.g., nodes 304) of various public and/or private cloud infrastructures.

Workload engines 332 may manage the deployment of application 316 and its corresponding workloads 302 at the nodes (e.g., node 304a and node 304b) where the workloads (e.g., workload 302a and workload 302b respectively) will be deployed. Agents 310 may communicate with and/or configure workloads 302 through APIs 308. Additionally, workloads 302 may utilize other nodes (e.g., trusted authority node 324a and trusted authority node 324b) to provide additional functionality. For example, workloads 302 may utilize controllers 314 and/or servers 312 of authenticating nodes (e.g., trusted authority node 324a and trusted authority node 324b) to authenticate to one another and establish trusted communications.

With applications increasingly being developed as a set of distributed services (e.g., workloads 302) running across a mix of multi-cloud and edge infrastructures (e.g., nodes 304) similar to architecture 300, enforcement of data compliance has only been made more complex and potential violations made more likely. Handling a mix of data types differentially subject to various regulations, and/or being utilized by geographically dispersed mobile endpoints creates complexities that are not addressed by current data compliance techniques.

The number of laws, regulations, and rules regarding the storage and use of certain types of data are continually increasing across the globe. For instance, the General Data Protection Regulation (GDPR) in Europe places strict regulations on how a user's personal data is collected and shared. These and other regulations have spawned independent efforts across several countries to ensure that online applications comply with specific data regulations at national, federal, or state level, and particularly, those that are cloud-based. This acceleration in data sovereignty regulations is posing complex challenges to the organizations that use or manage that data, since legal obligations and constraints vary from country to country. The challenge is even greater since data compliance requirements are often not limited to data sovereignty obligations. For example, depending on the type of an application, data compliance may demand the amalgamation of other regulations, such as industry-specific regulation (e.g., complying with HIPAA obligations in the healthcare industry in the United States), or organization-specific rules (e.g., on how to deal with confidential data).

Currently, data compliance is largely only being considered at deployment time. For instance, a multinational company (e.g., the application user in this example) may rely on a third-party software vendor to develop an application. The application may need to be deployed and/or used in different countries (e.g., in Russia, Canada, the USA and the UAE). Application developers are neither expected to have knowledge, nor to programmatically deal with, the intricacies of specific data regulations in different regions. However, they do have knowledge on the kind of data being stored, accessed, exchanged, etc. by their application (e.g., through the APIs that they develop). Despite this, developers lack programmatic methods and tooling to facilitate the task of application users or managers to adhere to data compliance rules. This void in existing development, security, and operations (DevSecOps) pipelines and toolchains represents one of the biggest obstacles to planning, instrumenting, and meeting compliance regulations before, during, and after an application is deployed. As a result, data compliance is a problem that is addressed today without programmatic guidance from the organization that knows the most about the application workloads and their corresponding data, that is, the application developer.

As described in greater detail below, a compliance engine 306 may be implemented to provide configuration, observability, and enforcement of data compliance policies. In order to achieve this role data compliance within the framework of the aforementioned complexities, utilizing compliance engine 306 to manage data compliance may involve introducing and leveraging a mechanism to identify types of data being used by application 316 and their applicable data compliance polices.

Beyond introducing the mechanism for identifying types of data and their applicable data compliance polices, utilizing compliance engine 306 to manage data compliance may also involve introducing a mechanism to monitor and enforce compliance policies regarding the localization and transfer of the various data types. Presently, there are a lack of mechanisms available to implement the data compliance policies to control data transfers between workloads 302. In some approaches (e.g., Secure Production Identity Framework for Everyone (SPIFFE) or mutual transport Layer security (mTLS)), each one of the workloads 302 are provided a cryptographic identity so that it can authenticate to another workload whether in the same cluster or in a different one (e.g., in multi-cluster settings).

For instance, a cloud native workload authentication technique such as SPIFFE may provide a security identity (ID) to each of the workloads 302 and enable an individual workload to identify and cryptographically authenticate other workloads that it needs to communicate with. In some examples, SPIFFE Verifiable Identity Documents (SVIDs) may be utilized to assign and carry workload IDs. The SPIFFE IDs may be uniform resource identifiers (URIs) (e.g., spiffe://trust_domain/workloadID).

Bundles may be used by a destination workload to verify the ID of a source workload and vice versa. The bundles may be a collection of one or more certificate authority (CA) root certificates that a workload should consider trustworthy. The bundles may contain public key materials such as X.509 and JWT SVIDs.

The IDs and/or bundles may be used and/or authenticated utilizing authenticating nodes 324. The IDs and/or bundles may be federated. For example, servers 312 may identify and authenticate with each other through the federation. Such federated servers may exchange both IDs and bundles and utilize the Agents 310 to assign secure IDs to workloads 302 and convey the bundles, so that a workload (e.g., workload 302a) can identify and authenticate other workloads (e.g., workload 302b).

Agents 310 may use API 308 to convey the IDs and bundles to the corresponding workloads. As mentioned above, workload engines 332 are the ones in charge of spinning up the workloads 302 at nodes 304. Tools, such as Kubernetes, may be used to this end. In such cases, each workload might have assigned a unique (internal) identifier within a workload engine 332 (e.g., a non-secure identifier assigned through Kubernetes). Such identifiers might need to be communicated to authenticating nodes 324 (e.g., using API 318 and controllers 314). This information may now be communicated to servers 312, which may in turn forward it to Agents 310. In this way, Agents 310 may now identify the workloads spawn up by workload engines 332 and assign secure IDs to them as well as provide the necessary bundles so that the workloads may now securely identify and authenticate other workloads. More specifically, a source workload (e.g., workload 302a) may provide its secure ID to identify and/or authenticate itself to a destination workload (e.g., workload 302b) and/or to establish trusted communication with the destination node based on the authentication (AuthN).

While these workload ID and AuthN techniques may be utilized to address the question of "Who am I talking to?" among distributed workloads 302, they do not address data authorization or data localization. For instance, the workload ID and AuthN techniques are not able to address the questions of "Given two workload IDs, what categories of data are these workloads authorized to exchange between them?" and/or "Given two workloads, where should these workloads be located such that the transfer of a specific category of data is compliant with existing regulations?".

Various techniques have been developed to create trustworthy systems and infrastructures (e.g., using a hardware root of trust, secure boot processes, firmware protections, etc.). Further, various infrastructure geolocation techniques including proof of node location may be utilized to establish where trusted infrastructure is located. For example, a geographic location of trusted infrastructure 320 may be remotely verified utilizing a geolocation verification process 322. Geolocation verification process 322 may be utilized in building a trusted workload and data localization system.

Some techniques may also cover remote attestation procedures to ensure that am application's runtime environment has not been tampered with. However, modern applications are often composed of a set of workloads which are executed in diverse platforms, such as virtual machines (VMs), containers, on bare metal, in serverless environments, etc. Hence, in many cases, the mere identification of such workloads across difference platforms may pose a challenge. For instance, different platforms may use different mechanisms to identify the workloads, therefore, workload-to-workload identification and authentication may be challenging.

As noted above, both trustworthy data authorization and data localization may be aspects implicated in modern data compliance. However, existing cross-platform workload identification and authentication mechanisms remain disconnected from techniques providing trusted infrastructures and proof of location.

For example, there is currently no integration between existing workload ID/AuthN techniques and existing geolocation verification techniques. That is, these techniques are unbonded (e.g., unbonded 323a) from one another and are not used together and/or leveraged by one another. Further, utilizing compliance engine 306 to manage data authorization and drive localization of data based on data compliance policies may involve introducing a mechanism to avoid any unbonding (e.g., unbonded 323b) of workload ID and AuthN techniques and/or geolocation verification techniques from compliance engine 306.

Thus, existing techniques leave modern applications unable to support the automated identification of data types and their applicable data compliance polices. Modern applications are also rendered unable to support monitoring and enforcement of data compliance policies regarding the localization and transfer of the various data types among distributed workloads of the application. Therefore, modern applications are unable to effectuate data compliance policies at the data transfer level and/or are unable to identify and authorize compliant data transfers even across already authenticated workload IDs subject to various compliance rules and regulations.

Compliant Data Transfers

The techniques herein introduce mechanisms for the automated binding of authenticated workload IDs and specific infrastructure resources with a provable location. Such bindings may be used by a compliance engine to authorize a data transfer between two authenticated workloads, subject to various compliance results and/or regulatory obligations that may apply to the specific category of data to be transferred. These mechanisms may address data compliance requirements, such as GDPR in Europe, which restrict where and how certain types of data are stored, retained, accessed, used, etc.

Illustratively, the techniques described herein may be performed by hardware, software, and/or firmware, such as in accordance with data transfer compliance process 248, which may include computer executable instructions executed by the processor 220 (or independent processor of interfaces 210) to perform functions relating to the techniques described herein.

Specifically, according to various embodiments, a device may determine a compliance status of a communication of a type of data between a first workload and a is second workload based on a data compliancy policy and a verified node location of at least one of the first workload and the second workload. The device may send, based on the compliance status of the communication, an instruction for handling the communication to at least one of a node executing the first workload and a node executing the second workload.

Figure 4:
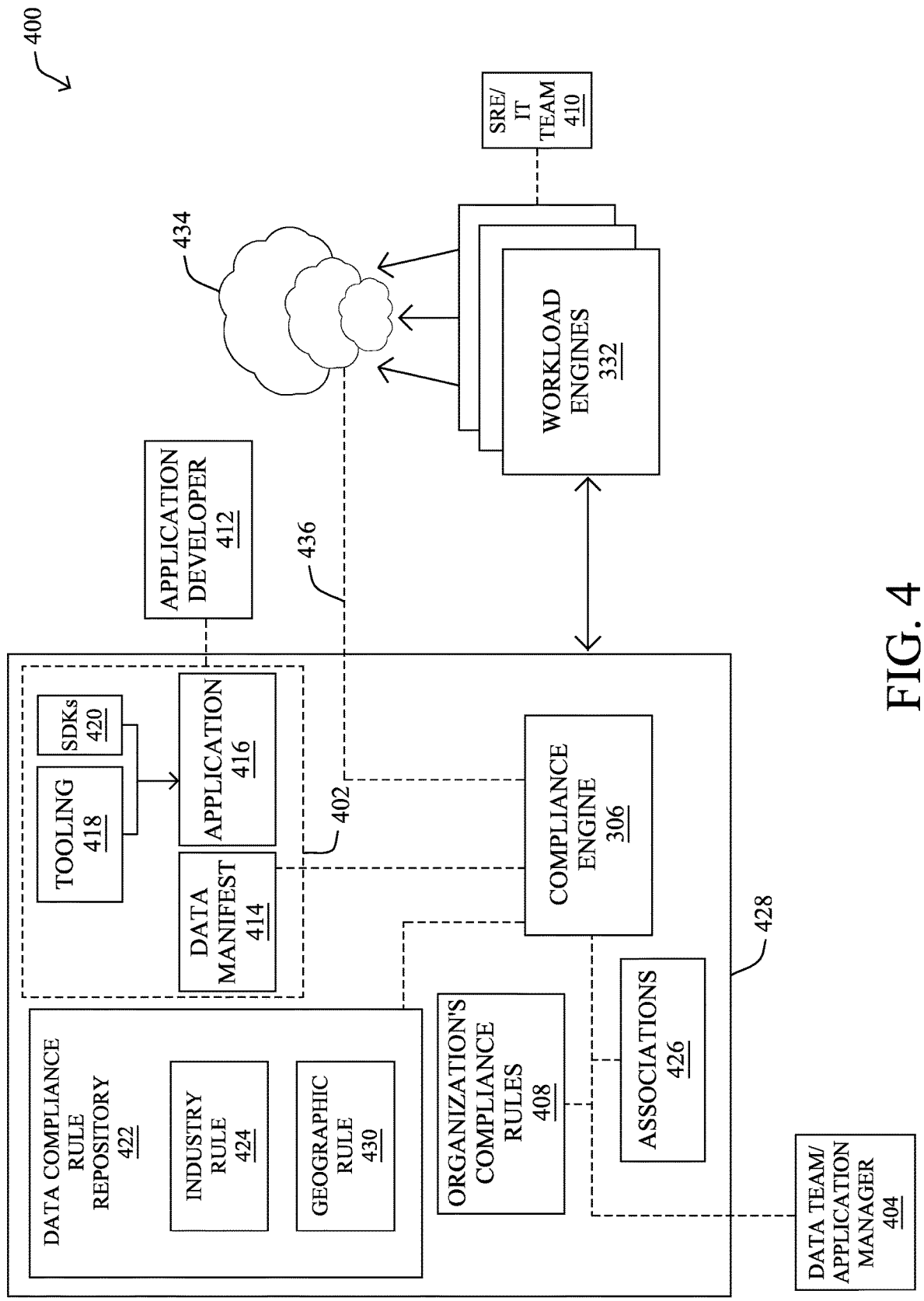
FIG. 4 illustrates an example architecture for data compliance and protection bindings.

Operationally, FIG. 4 illustrates an example architecture 400 for data compliance, according to various embodiments. The architecture 400 may include a data compliance process 428. Data compliance process 428 may be utilized to provide configuration, observability, and enforcement of data compliance rules. Data compliance process 428 may accomplish these functions utilizing Data Compliance as Code (DCaC).

DCaC may include integrating a data compliance mechanism into the program code of the application. For example, data compliance process 428 may be utilized to build data compliance into the application development process, supported by automated code annotations, bindings between such annotations and categories of sensitive data, and controls at code, build, and pre-deploy time. Data compliance process 428 may provide a mechanism whereby application developers proactively assist data teams, application managers, and legal departments with data compliance, while ensuring that developers may remain oblivious to specific regulations, data related obligations, or compliance requirements that organizations might have across different regions.

For example, data compliance process 428 may include data annotating process 402. Data annotating process 402 may facilitate application developer 412 automatically adding metadata to program code of an application 316 during the development of the application 316. In various embodiments, this may be performed by automated annotations of data fields in the program code and by the creation of references to such annotations at code-build time. These references to annotated code may be automatically rendered in the form of machine-readable data manifest 414.

More specifically, data annotating process 402 may provide a mechanism for automated annotations of the program code of application 316, including classes, application programming interfaces (APIs), and the resulting data at code/ build time (e.g., by implementing a Low-Code/No-Code approach supported by software development kits (SDKs) 420 and tooling 418). Application developers may utilize SDKs 420 and tooling 418 to automatically label data topics, data producers, data consumers, data processors, data holders, etc. For instance, developers may label certain data by annotating it with a data type identifier. For example, a developer may annotate certain data as "protected-type-1," or other data as "protected-type-2," and so on.

SDKs 420 in data annotating process 402 may provide a set of predefined data types out-of-the-box, including associations by default to specific categories of sensitive data. Sensitive data may include a type of data that may be considered personal, private, sensitive, confidential, protected, secret, restricted, personally identifiable information (PII), etc. In some examples, sensitive data may include data that is subject to regulation. For example, Table 1 lists examples of predefined protected data types and default associations to some examples of categories of sensitive data.

TABLE 1

| PROTECTED DATA TYPE | DEFAULT ASSOCIATION |
| --- | --- |
| protected-type-1 | Customer PII |
| protected-type-2 | Employee PII |
| ... | ... |
| protected-type-23 | Patient Analysis Results |
| ... | ... |
| protected-type-41 | Sales Confidential |
| ... | ... |
| protected-type-56 | Restricted HR |
| ... | ... |
| unprotected | NA |

A list of the associations, such as the example illustrated in Table 1, may provide associations by default to several categories of sensitive data, including but not limited to PII, confidential, restricted, and unprotected data. In some embodiments, the set of predefined protected data types might be standardized or rely on an existing taxonomy.

SDKs 420 in data annotating process 402 may also provide a mechanism to define and use custom data types in annotating program data of the application 316. For example, custom data types may be utilized, which identify protected data types that are not covered by any of those available by default in SDKs 420. For example, "custom-type-1" might be a custom data type associated to a category of sensitive data such as "Restricted Employee Poll." In various embodiments, the generation and/or insertion of the annotations into the program code of the application 316 may be accomplished by an automated process (e.g., a programmatic identification of data of a particular data type triggering an automated insertion of an annotation of the data as the particular data type, etc.), a partially automated process (e.g., a programmatic flagging of data of a particular data type with a supervised or manual annotation of the data as the particular data type, etc.), and/or a manual process (e.g., a manual flagging of data of a particular data type and/or a manual annotation of the data as the particular data type, etc.).

In various embodiments, associations between protected data types and categories of sensitive data may be assigned and/or instrumented by different organizations and at different moments in time. In some cases, the association between protected data types and categories of sensitive data may be assigned by application developers 412 at code/build time. This might be the case when the team of application developers 412 is part of, or develops for, the organization that may use or manage the application 316. In such cases, the team of application developers 412 might have sufficient knowledge about the data and their use, so that they may either use the associations provided by default or create custom ones.

In additional instances, application developers 412 of application 316 and/or the users of the application 316 might belong to different organizations. For example, this may be the case when application developers 412 are a DevSecOps team that develops an application 316 that may be used across different organizations, industries, etc. In such cases, application developers 412 may be unaware of the categories of data that should be assigned by a data team and/or application manager 404 in another organization (e.g., precisely what data is confidential and what data is not with respect to that organization and its use of the application 316). In these instances, application developers 412 may leverage SDKs 420 and tooling 418 to approach data labeling and association in a manner that sidesteps the knowledge deficit while still instilling the functionality. For example, the application developers 412 may leverage SDKs 420 and tooling 418 to automatically add the different classes of protected data type at code and build time (e.g., utilizing predefined and custom protected data types). Additionally, or alternatively, the application developers 412 may leverage SDKs 420 and tooling 418 to automatically insert references in the form of machine-readable descriptions for the protected data types that may be used to generate data manifest 414 bound to application 316 at build time.

The protected data type annotations and their corresponding references may be utilized by a data team and/or application manager 404 in another organization to select and/or create automated associations 426 between categories of annotated data in the application 316 (e.g., metadata provided by application developers 412) and specific categories of sensitive data (e.g., personal data, private data, sensitive data, confidential data, protected data, secret data, restricted data, PII, etc.). For instance, each protected data type might be bonded to a class of tokens (e.g., JSON Web Tokens with a specific scope), which in turn might represent different categories of sensitive data for a data team and/or application manager 404.

In a specific example, an API call for application 316 may be labeled by application developers 412 with a data type identifier such as "custom-type-7" at code/build time. The "custom-type-7" labeled API call may attempt to access certain data using its bound token (e.g., "Token 7") with a scope defined by, for example, a data team and/or application manager 404 before application 316 was deployed. From the data team and/or application manager 404 perspective, the attempt to access this data may translate to a request to access, for instance, "Confidential Partner" data. As such, the data type labels, and their associations may be utilized as an automated data mapping between the programmatic operations of application 316 and the sensitive data implicated in those operations. In various embodiments, these associations and functionalities may be supported by compliance engine 306 based on the selection, configuration, and automation of data compliance rules before application 316 is deployed and/or post-deployment.

In some examples, application developers 412, which again may be a DevSecOps team, might opt for a hybrid approach to generating these associations. For example, this may be the case when making some custom associations between data types and categories of sensitive data or using those predefined in the system (e.g., "protected-type-1" to "Customer PII") might not only be trivial for the application developers 412 but also may facilitate the task of a data team and/or application manager 404 in defining associations. However, other associations might not be apparent to application developers 412. Hence, certain data in application 316 may be labeled as "protected types" along with their corresponding machine-readable descriptions in data manifest 414, though they may remain unassigned to a specific category of sensitive data, so they can be associated later by a data team and/or application manager 404 before the application is deployed, or by an automated data lineage, classification, and tagging process at run time (e.g., during the testing phase, that is, before the application is deployed in production).

In some embodiments, a data team and/or application manager 404 may be provided with a mechanism to change the associations created by application developers 412 or even associate more than one category of sensitive data to a given data type (e.g., a data team and/or application manager 404 may associate certain data with both "Employee PII" and "Confidential Data"). Hence, two categories of data compliance policies (e.g., one for "Employee PII" and another for "Confidential Data") may apply and restrict even further the access to this category of data. In general, a data team and/or application manager 404 may be able to Create, Read, Update, or Delete (CRUD) any association between the metadata provided by application developers 412 and categories of sensitive data.

In various embodiments, a data team and/or application manager 404 may proactively create a set of custom data types. A data team and/or application manager 404 may provide the set of custom data types to application developers 412. Application developers 412 may then utilize the set of custom data types so that application 316 is annotated at development based on guidelines (e.g., the set of custom data types, etc.) provided beforehand by the data team and/or application manager 404.

In additional embodiments, application developers 412 and a data team and/or application manager 404 may collaborate to annotate application 316. For example, application developers 412 and a data team and/or application manager 404 may iterate in the annotation and association processing in an agile manner. For example, the iteration may be performed as part of a continuous integration/continuous delivery (CI/CD) pipeline (e.g., at testing, staging, and production).

In some examples, application 316 may be composed of several services developed with different programming languages. Therefore, application 316 may utilize different SDKs 420. In some instances, the annotation methods and terminology applied to application 316 may vary depending on the programming language (e.g., usually referred to as attributes in C#, decorators in Python, annotations in Golang, etc.). In such cases, tooling 418 of data annotating process 402 may examine the different predefined and custom data types used with different SDKs 420, perform checks, and ensure consistency in the annotations and enumeration across the different services at build time. For example, these consistency checks may ensure that a given "custom-type-X" data type identifier represents the same type of data across services programmed using different programming languages even if they were programmed by different developers. Overall, the data annotating process 402 may provide different degrees of freedom to application developers 412, data teams and/or application managers 404, and the number of protected data types used, and their corresponding associations may vary depending on the type of application 316.

Data annotating process 402 may, as described above, be utilized in generating automated data references. Specifically, data annotating process 402 may automatically render a data manifest 414 bonded to application 316 at build time. Data manifest 414 may provide machine-readable descriptions of the predefined and/or custom data types used by application 316. A combination of SDKs 420 and tooling 418 may facilitate the instrumentation and automation of the program code at build time, including the automated rendering of data manifest 414. In some cases, application 316 may be composed of various containers. Each container may be built and packaged with its own data manifest, such that the final data manifest rendered for application 316 may be a composition of the individual data manifests. In some cases, application 316 may include dependencies on external services, such as a MySQL database. Such dependencies may be captured as a dependency manifest. Data fed, processed, retained, or retrieved from these external services may also be annotated and automatically captured in application 316 data manifest 414.

Data annotating process 402 may, as described above, be utilized for decoupling data compliance from the business logic of application 316. For example, SDKs 420 and tooling 418 of data annotating process 402 may provide automated mechanisms for decoupling the configuration, observability, and enforcement of data compliance rules from the business logic of application 316. In some instances, application 316 may be a cloud/edge native application, which may be implemented as a set of workloads composing a service mesh. The decoupling of data compliance from the business logic may be especially relevant for applications of this type, as geographically dispersed and/or variably deployed workloads may implicate increased data compliance complexity.

Various possible embodiments for decoupling data compliance from the business logic of application 316 may be utilized. For instance, a sidecar model, where the services that implement the business logic of application 316 are deployed together with sidecar proxies associated to each of those services, may be utilized. The sidecar proxies may be utilized to enforce horizontal functions that are independent of the business logic, such as routing, security, load balancing, telemetry, retries, etc. As such, the sidecars may be well-positioned to decouple, observe, and control data compliance. For example, a combination of distributed data compliance controllers and sidecar proxies may be used to configure, observe, and enforce data compliance rules across different geographies, and distributed multi-cloud and edge infrastructures 434.

Instead of, or in addition to, using sidecars, various embodiments may use client libraries, daemons working in tandem with the application-specific services, or sandboxed programs in the OS kernel, e.g., using the Extended Berkeley Packet Filter (eBPF). Further embodiments may use an agentless approach or embed such functionality in Kubernetes itself. In any case, the functionality introduced herein may enable the portability and reuse of observability and enforcement of data compliance functions across not only different applications but also cloud and edge environments.

The above-described data annotating process 402 may yield a portable annotated application 316 that is geared with built-in annotations for different types of protected data. In addition, the yielded annotated application 316 may be structured to operate while remaining agnostic of any state, country, industry, organization-specific regulation and/or data policy requirements that a data team and/or application manager 404 might have. As a result, data annotating process 402 may be leveraged as a new model of building applications including DCaC by not only data teams and/or application managers 404, but also software as a service (SaaS) providers and others.

Data compliance process 428 may provide configuration, observability, and enforcement of data compliance rules. As described above, associations 426 between categories of annotated data in application 316 and specific categories of sensitive data may be instrumented prior to a deployment of application 316. The associations 426 may be used to control the processing and use of data during and after the deployment of application 316. More specifically, compliance engine 306 may utilize associations 426 together with current data compliance regulations governing data handling in each region where application 316 may be used, as well as a specific organization's compliance rules 408 for/while using application 316, to enforce compliance with them. Such controls may apply to data access requests, data storage and retention policies, data processing requirements, etc. of application 316 both at deploy and execution time, etc.

To this end, data compliance process 428 may include data compliance regulation repository 422. Data compliance regulation repository 422 may provide a repository of data compliance rules. For example, data compliance regulation repository 422 may include a repository of industry regulations 424 which may be applicable to the use of application 316. For example, with respect to instances where application 316 is used by a healthcare provider, data compliance regulation repository 422 may include industry regulations 424 such as Health Insurance Portability and Accountability Act of 1996 (HIPAA) regulations applicable to handling of data in the healthcare industry. In other examples, data compliance regulation repository 422 may include a repository of national regulations 430 which may be applicable to the use of application 316. For example, with respect to instances where application 316 is based in a member state of the E.U., data compliance regulation repository 422 may include national regulations 430 such as the GDPR applicable to handling of data in the E.U.

The data compliance regulations included in data compliance regulation repository 422 may be consumed by a data team and/or application manager 404 as a service (aaS). Data compliance regulation repository 422 may support input, expression, collection, approval, visualization, and/or use of data compliance policies covering multiple categories of rules. For example, data compliance regulation repository 422 may store data compliance policies that are specific to an industry, those that may apply at a national, multi-national, federal, state, and industry levels, etc. For instance, an organization (e.g., a multi-national company) may leverage a data compliance regulation repository 422 service of a data compliance process 428 and utilize the regulations already available in data compliance regulation repository 422, which may cover regulations across several industries and countries out-of-the-box. An organization may select the target state, country or region, the industry if needed, and select the data compliance regulations that may be applicable at the organizational level (e.g., organization's compliance rules 408).

Compliance engine 306 may offer APIs and a user-friendly user interface (UI) through which a data team and/or application manager 404 may select and define data compliance requirements. For instance, if application 316, which handles Customer PII data, needs to be deployed in British Columbia, Canada, a data team and/or application manager 404 may simply select "Customer PII→Apply Local Regulation" to constrain the processing, storage, retention, and access to Customer PII data according to the regulations in British Columbia as retrieved from data compliance regulation repository 422. To this end, compliance engine 306 may compute and handle the resulting constraints that apply to Customer PII data in British Columbia transparently to data teams and/or application managers 404. More specifically, the set of data compliance constraints may be captured in a machine-readable format from data compliance regulation repository 422, and therefore, used by compliance engine 306 programmatically.

In some examples, compliance engine 306 may be utilized as a pluggable module working in tandem with one or more of workload engines 332, such as Cisco Intersight or any automation tool offered by a hyperscaler, or other cloud and edge providers. Workload engines 332 may manage the deployment of application 316, subject to the rules and constraints provided by compliance engine 306.

In various embodiments, compliance engine 306 may operate either in a push or a pull model. For instance, in a pull model, workload engine 332 may receive a request to deploy application 316 in a given region (e.g., a request from a site reliability engineering (SRE) and/or information technology (IT) team 410). In such a case, workload engine 332 may issue a request to compliance engine 306, to compute and return data compliance rules and constraints that must be applied for their specific deployment. Alternatively, in a push model, a data team and/or application manager 404 may select the compliance rules required and a declarative intent for application deployment may be issued from compliance engine 306 to one or more of workload engines 332. Such deployments may involve multi-cluster service meshes, which may run across multi-cloud and edge infrastructures 434. In various embodiments, the above-described sidecar proxies in the service mesh may not only provide monitoring and observability of data compliance to compliance engine 306 but also may receive configuration and compliance updates in real-time 436. In additional embodiments, the same functionality may be implemented utilizing client libraries, daemons, eBPF, an agentless approach, or Kubernetes itself. In addition, some embodiments may support the techniques described herein without utilizing a service mesh.

Figure 5:
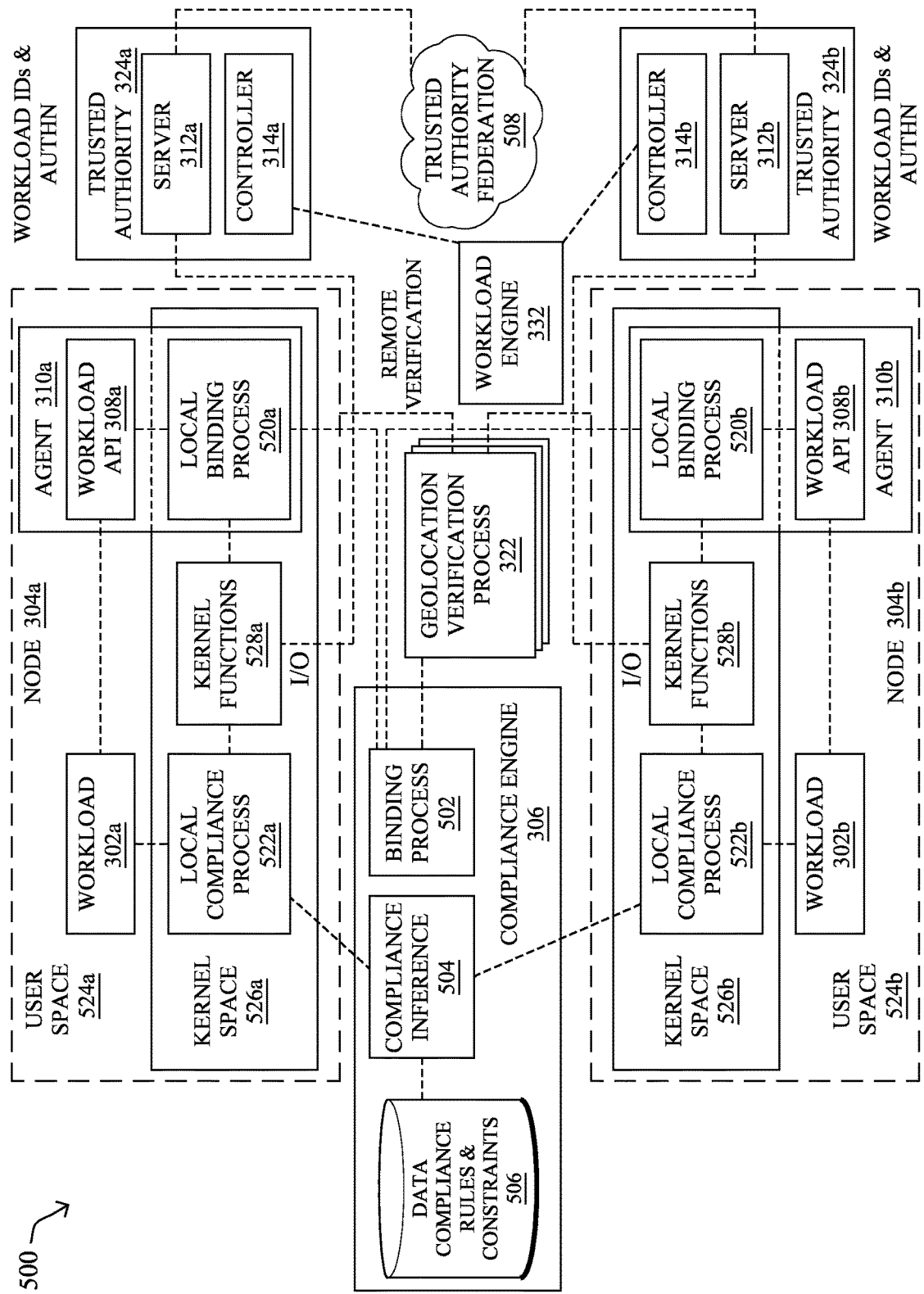
FIG. 5 illustrates an example architecture for performing compliant data transfers.

FIG. 5 illustrates an example architecture 500 for performing compliant data transfers according to various embodiments. Architecture 500 may be utilized to enable the automated creation of bindings between workload identifiers and the infrastructure (e.g., a particular one of the nodes 304) where the identified workload 302 runs. In various embodiments, the infrastructure may be infrastructure with a provable location. The bindings may be utilized by compliance engine 306 to manage data compliance policy enforcement at a data transfer level. For example, compliance engine 306 may utilize the bindings and/or geolocation verifications to authorize and/or otherwise manage a data transfer between two authenticated workloads 302, subject to various compliance rules and/or regulatory obligations that may apply to the specific category of data to be transferred.

Architecture 500 may comprise infrastructure including nodes 304. Nodes 304 may include computational infrastructure across which an application's workloads 302 are distributed. Nodes 304 may be geographically dispersed and/or based/operating on different computing platforms.

Nodes 304 may execute their respective workload 302 to deliver a specific functionality of the application.

Executing a workload 302 may include handling or using various types of data. Handling or using a type of data may include sending, receiving, storing, transforming, and/or otherwise using the type of data. The specific type of data being handled or used may be identifiable utilizing the aforementioned DCaC annotations.

Each node may be logically divided into a user space 524 and a kernel space 526. User space 524 may be conceptualized as the virtual space of a node where workload 302 and/or workload API 308 of agent 310 operate, are accessed, and/or are executed. Kernel space 526 may be conceptualized as the virtual space where local compliance process 522, kernel functions 528, and/or local binding process 520 of agent 310 operate, are accessed, and/or are executed.

An agent 310 of each node 304 may include a workload API 308 and local binding process 520. Workload API 308 may include a communication and/or control interface with a workload 302 of that node 304. Workload API 308 may additionally interface with local binding process 520 of node 304.

Each workload 302 executed at a node 304 may include a workload ID. A workload ID may include an identifier that uniquely identifies the corresponding workload 302. For example, a first workload (e.g., workload 302a) of a first node (e.g., node 304a) may have a first workload ID and a second workload (e.g., workload 302b) of a second node (e.g., node 304b) may have a second workload ID that is distinct from the first workload ID. Each workload ID may be a cryptographic identity of its corresponding workload 302. In various embodiments, the workload ID may include a security identity provided by a cloud native workload authentication technique such as SPIFFE.

Agent 310 of each node 304 may execute local binding process 520 for node 304. Local binding process 520 may have access to the workload IDs. In some examples, the access may be read-only access to the workload IDs. For example, local binding process 520 may have read-only access to bundles containing, for instance, other workload IDs and/or certificates.

Local binding process 520 in each agent 310 may also have a unique ID. For example, a first local binding process (e.g., local binding process 520a) of a first node (e.g., node 304a) may have a first local binding process ID and a second local binding process (e.g., local binding process 520b) of a second node (e.g., node 304b) may have a second local binding process ID that is distinct from the first local binding process ID.

In addition to local binding process 520, each node 304 may also execute a local compliance process 522 associated with each agent 310. Local compliance process 522 may interface with kernel functions 528, which may also interface with local binding process 520. Each local compliance process 522 may also have its own unique ID. For example, a first local compliance process (e.g., local compliance process 522a) of a first node (e.g., node 304a) may have a first local compliance process ID and a second local compliance process (e.g., local compliance process 522b) of a second node (e.g., node 304b) may have a second local compliance process ID that is distinct from the first local compliance process ID.

Local binding process 520 in the agent 310 may include a mechanism that binds agent 310 to trusted metrics in the infrastructure node 304 (e.g., using trust anchors, trusted measurements, etc.) as well as to the local compliance process 522. In various embodiments, such functionality might be instrumented through a forward signing interlock technique.

Local binding process 520 in each agent 310 may also register itself to a binding process 502 in a global compliance engine (e.g., compliance engine 306). Here, binding process 502 in compliance engine 306 may have access to remote verification results. For example, binding process 502 may have access to remote verification results attesting to and/or proving a geolocation of each node 304. For instance, a geolocation verification process 322 may provide the remote verification results attesting to and/or proving a geolocation of each node 304.

In addition, binding process 502 of compliance engine 306 may bind a node ID (uniquely identifying the node 304) and traces in the remote verification results obtained for the node 304 with a specific local binding process ID. In turn, local binding process 520 at each node 304 may bind local workload IDs and bundles to its own local binding process ID. Thus, local binding process 520 may securely communicate the local workload IDs and the corresponding bundles managed for each workload 302 to the binding process 502 in compliance engine 306.

Similarly, binding process 502 of compliance engine 306 may bind a workload ID and the corresponding local binding process ID to a specific node ID as well as to a proof of geolocation obtained from geolocation verification process 322. A compliance inference module 504 of compliance engine 306 may have access to a data compliance rules and constraints repository 506. In some examples, rules and constraints repository may include and/or be derived from data compliance regulation repository 422 as described in FIG. 4.

Compliance inference module 504 may provide the ability to analyze the bundles received by each workload 302, infer a workload mesh, and determine which workload-to-workload communications are out of compliance based on the information received from binding process 502 and data compliance rules and constraints repository 506 in compliance engine 306. In addition, compliance inference module 504 in compliance engine 306 may push a data compliance policy to a local compliance process 522. The data compliance policy may include an instruction to observe, log, and potentially filter, at a data plane level, all data transfers that are out of compliance.

The trusted exchange of workload IDs and bundles may be supported by a trusted authority node 324 including servers 312 and controllers 314 which may interface with workload engine 332 to support the trusted exchange of the initial (non-secure) workload identifiers. In some examples, the trusted exchange of workload IDs and bundles may be supported by a trusted authority federation 508.

In some embodiments, both local binding process 520 and local compliance process may be embodied as eBPF processes running in kernel space 526. Alternative or additional embodiments may rely on a sidecar model in user space 524, a daemon set, or other potential implementations.

In some scenarios, compliance engine 306 might not have direct access to the nodes 304, and therefore, the bindings may be proxied and instrumented through trusted authority node 324 and/or trusted authority federation 508. Likewise, local compliance functions may be proxied and instrumented through trusted authority node 324 and/or trusted authority federation 508. In such scenarios, compliance engine 306 may interface with external geolocation verification process 322 as well as with through trusted authority node 324 and/or trusted authority federation 508.

In some embodiments, trusted authority node 324 and geolocation verification process 322 might be integrated. In some embodiments, local compliance process 522 may only observe, log, and notify non-compliant data transfers. That is, enforcement actions may involve a human in the loop and manual activation of enforcement.

In other embodiments, compliance engine 306 may require the deployment of independent connectors (e.g., in the form of a VM within each trust domain). Such connectors may interface either with the agents 310 or with the trusted authority nodes 324 to gain read-only access to the metadata (i.e., the workload IDs, the bundles, trusted metrics, etc.).

Figure 6A:
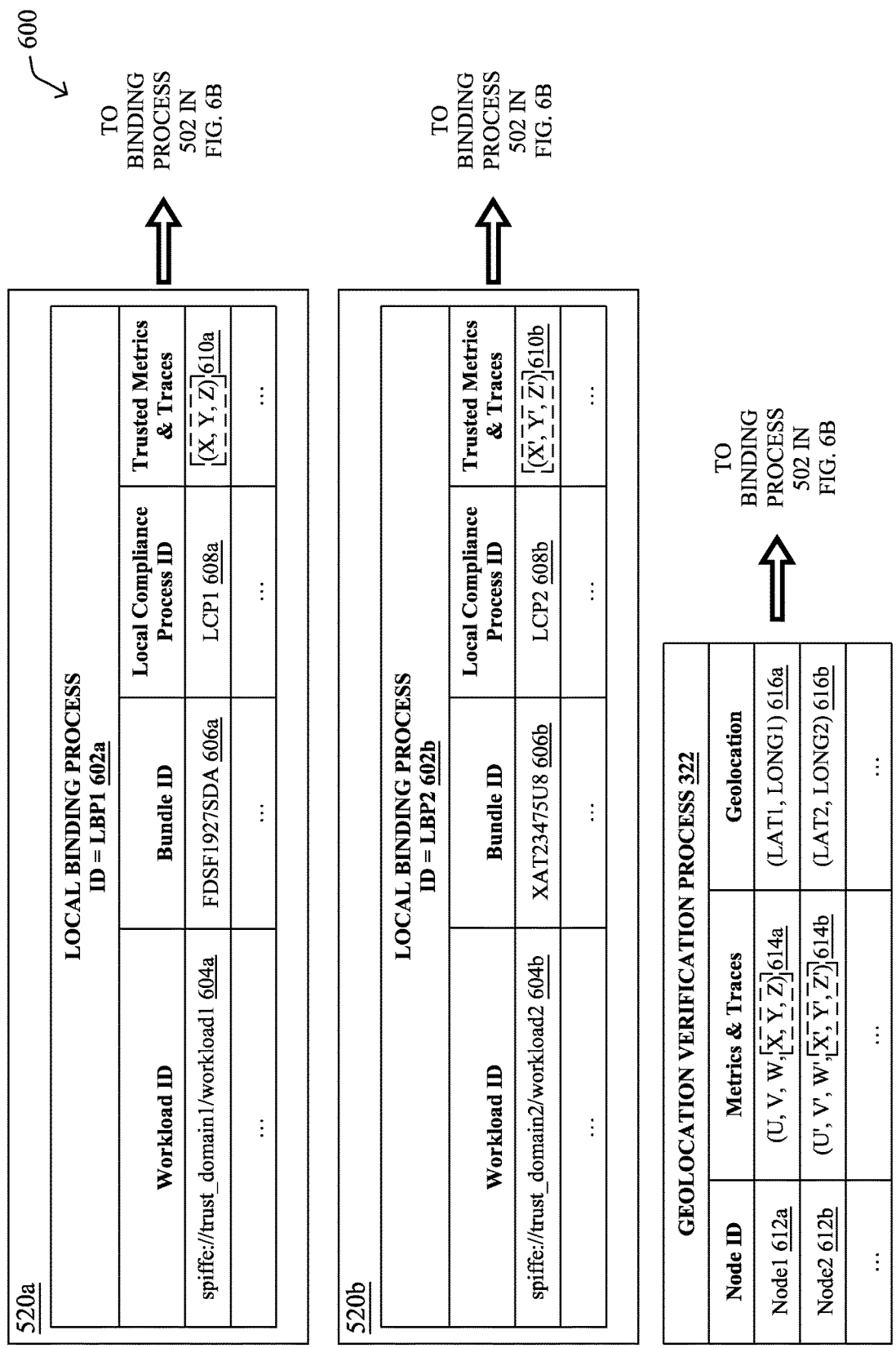
FIGS. 6A-6B illustrate an example simplified procedure for performing compliant data transfers.
Figure 6B:
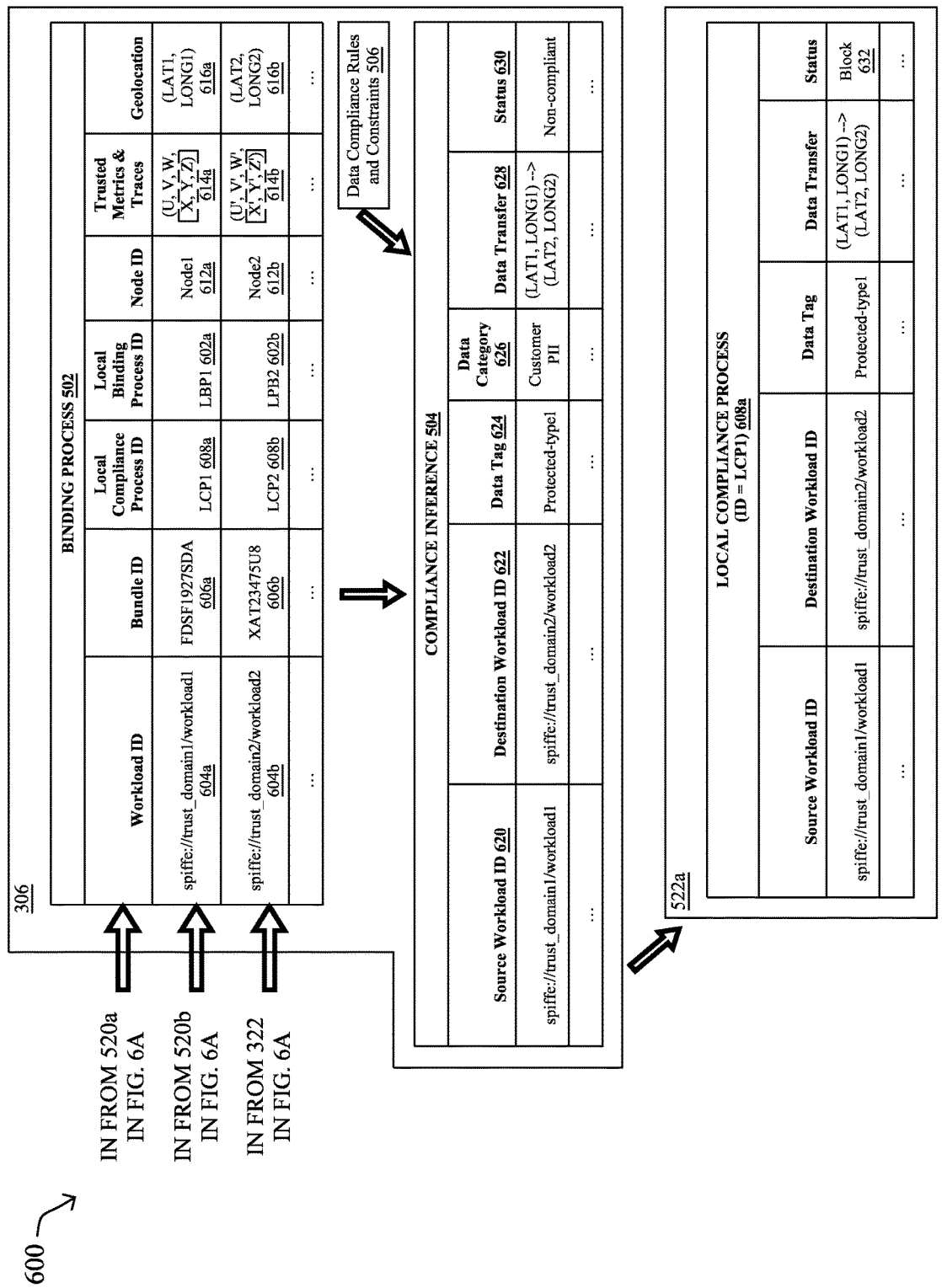

FIGS. 6A-6B illustrates an example procedure 600 for performing compliant data transfers according to various embodiments. Procedure 600 may be executed utilizing components of architecture 500 illustrated in FIG. 5.

A first local binding process (e.g., local binding process 520a) may execute at and/or in association with a first infrastructure node. The first local binding process may be associated with a unique first local binding process ID (e.g., local binding process ID 602a).

The first local binding process may be executable to create automated bindings for a first workload executing at the first node, bundles associated with the first workload, and/or its own first local binding process ID (e.g., local binding process ID 602a) and communicate them to binding process 502 in compliance engine 306. The first workload may be associated with a unique first workload ID (e.g., workload ID 604a). A first bundle of the first workload may be associated with a unique first bundle ID (e.g., bundle ID 606a). The local compliance process executing at the first node may be associated with a first local compliance process ID (e.g., local compliance process ID 608a). In addition, the first local binding process may include trusted metrics and traces 610a.

The first local binding process (e.g., local binding process 520a) may access the first workload ID and/or may access bundles of the first workload that may contain other workload IDs and/or certificates. The first local binding process may have its own unique ID (e.g., local binding process ID 602a), which it may bind to trusted metrics and traces 610a in the first node as well as to a local compliance process 522a and/or a local compliance process ID 608a of local compliance process 522a executing at the first node. Therefore, the first local binding process may produce a binding including workload ID 604a, bundle ID 606a, local compliance process ID 608a, and/or trusted metrics and traces 610a bound to local binding process ID 602a.

Local binding process 520a of the first node may register to binding process 502 of compliance engine 306. Local binding process 520a may communicate the binding that it created including local workload ID 604a, bundle ID 606a, local compliance process ID 608a, trusted metrics and traces 610a, and/or local binding process ID 602a to binding process 502 of compliance engine 306.

Binding process 502 may access remote verification results proving the geolocation of the first infrastructure node ID associated with the binding. For example, binding process 502 may obtain the remote verification results through a trusted geolocation verification process 322. The remote verification results may include a node ID 612 of the node being verified.

For example, geolocation verification process 322 may include a first node ID (e.g., node ID 612a) for the first node associated with the first local binding process (e.g., local binding process 520a). The geolocation verification results may also include metrics and traces 614a for the first node obtained through geolocation verification process 322 as well as an indication of a geolocation 616a of the first node, which may be expressed as latitude and longitude coordinates or as some other expression of location. Binding process 502 of compliance engine 306 may bind the node ID 612a and traces 614a in the verification results for the first node obtained from geolocation verification process 322 with the specific local binding process ID 602a and local compliance process ID 608a for the first node.

In various embodiments, binding process 502 of compliance engine 306 may, for a first node, bind workload ID 604a and a corresponding local binding process ID 602a to the node ID 612a as well as to the proof of geolocation obtained from geolocation verification process 322. As a result, for the first node, binding process 502 may generate a binding including workload ID 604a, bundle ID 606a, local compliance process ID 608a, local binding process ID 602a, node ID 612a, trusted metrics and traces 614a, and/or geolocation 616a of the first node and/or workload.

Likewise, a second local binding process (local binding process 520b) executing at and/or in association with a second infrastructure node may perform the functionalities as described above in the context of the first node but for the second node and its workloads. Geolocation verification process 322 may perform the functionalities described above in the context of the first node for the second node as well.

Binding process 502 of compliance engine 306 may perform the functionalities described above in the context of the first node for the second node as well. As a result, binding process 502 of compliance engine 306 may generate a binding including workload ID 604b, bundle ID 606b, local compliance process ID 608b, local binding process ID 602b, node ID 612b, trusted metrics and traces 614b, and/or geolocation 616b of the second node and/or second workload, in addition to those of the first node and/or first workload.

Compliance inference module 504 of compliance engine 306 may analyze the bundles received for each workload. Compliance inference module 504 may infer the workload mesh from the bindings as well. In addition, compliance inference module 504 may access data compliance rules and constraints repository 506 and/or determine which of the data compliance policies in the data compliance rules and constraints repository 506 are applicable to each workload communication. Compliance inference module 504 may make such a determination based on a type of data being used (e.g., communicated, sent, received, stored, saved, transformed, handled, etc.) by the workload. The type of data being used may be determined utilizing DCaC annotations of data type and/or their corresponding data category.

Compliance inference module 504 may determine a compliance status of each workload-to-workload communication involving the workloads based on the information received from binding process 502 and data compliance rules and constraints repository 506 in compliance engine 306. For example, compliance inference module 504 may utilize the data compliance rules and constraints repository 506 and/or those data compliance policies in the data compliance rules and constraints repository 506 and determine which ones are applicable to each workload communication in order to resolve which workload-to-workload communications are out of compliance when referenced against the information received from binding process 502 regarding the communication between the workloads.

For example, the data compliance policies of data compliance rules and constraints repository 506 may specify a geographic location where a type of data may be utilized. As such, a workload-to-workload communication may be determined to be in compliance (e.g., compliance status: compliant) if the geolocation of the source node and the geolocation of the destination node involved in the communication are within the geographical location where the type of data that they are communicating is allowed to be utilized. Conversely, a workload-to-workload communication may be determined to not be in compliance (e.g., compliance status: non-compliant) if the geolocation of the source node and the geolocation of the destination node involved in the communication are not within the geographical location where the type of data that they are communicating is allowed to be utilized.

For example, compliance inference module 504 may, for a workload-to-workload data communication, utilize the results of binding process 502, DCaC elements, and/or corresponding data compliance policies from data compliance rules and constraints repository 506 to determine a source workload ID 620 of the communication, a destination workload ID 622 of the communication, a data tag 624 of the data included in the communication (e.g., available through metadata added as part of a DCaC process), a data category 626 of the data included in the communication (e.g., also available as part of the associations involved in a DCaC process), data transfer details 628 including the workload geolocations, and a compliance status 630 for the communication.

In various embodiments, compliance inference module 504 may send, based on the compliance status of a workload-to-workload communication, an instruction 632 for handling the workload-to-workload communication to at least one of local compliance process 522*a* associated with the first workload involved in the workload-to-workload communication and/or a local compliance process (not illustrated) associated the second workload involved in the workload-to-workload communication. Sending the instruction 632 may include pushing a policy and/or instruction to one or more local compliance processes to observe, log and/or potentially filter, at data plane level, all data transfers that are out of compliance.

For example, if the policy and/or instruction implicates enforcement at only a first node executing a first workload (e.g., in instances where the second node is outside a geolocation where the type of data is permitted to be handled), then the policy and/or instruction may be pushed to only the first local compliance process associated with the first node and/or first workload. Conversely, if the policy and/or instruction implicates enforcement at both a first node executing a first workload and a second node executing a second workload (e.g., in instances where both the first node and the second node are outside a geolocation where the type of data is permitted to be handled), then the policy and/or instruction may be pushed to both the first local compliance process associated with the first node and/or first workload and a second local compliance process associated with the second node and/or second workload.

In this manner, procedure 600 may be utilized to enforce data compliance policies at the data transfer level. That is, techniques are described which allow for different data compliance policies applicable to various types of data and/or in various geolocations to be enforced in an automated and dynamic manner while ensuring that the underlying infrastructure is a trusted actor with authenticated characteristics (e.g., geolocation, etc.) applicable to the data compliance policy. The architecture described with respect to these techniques may also allow for rapid adaptation to evolving data compliance rules and regulations. For example, as data compliance rules and regulations are created and/or modified, they may be rapidly populated to the data compliance rules and constraints repository 506 so that they are immediately applied to workload communications involving data types implicated by the data compliance rules and regulations without substantial reconfiguration of the system.

Figure 7:
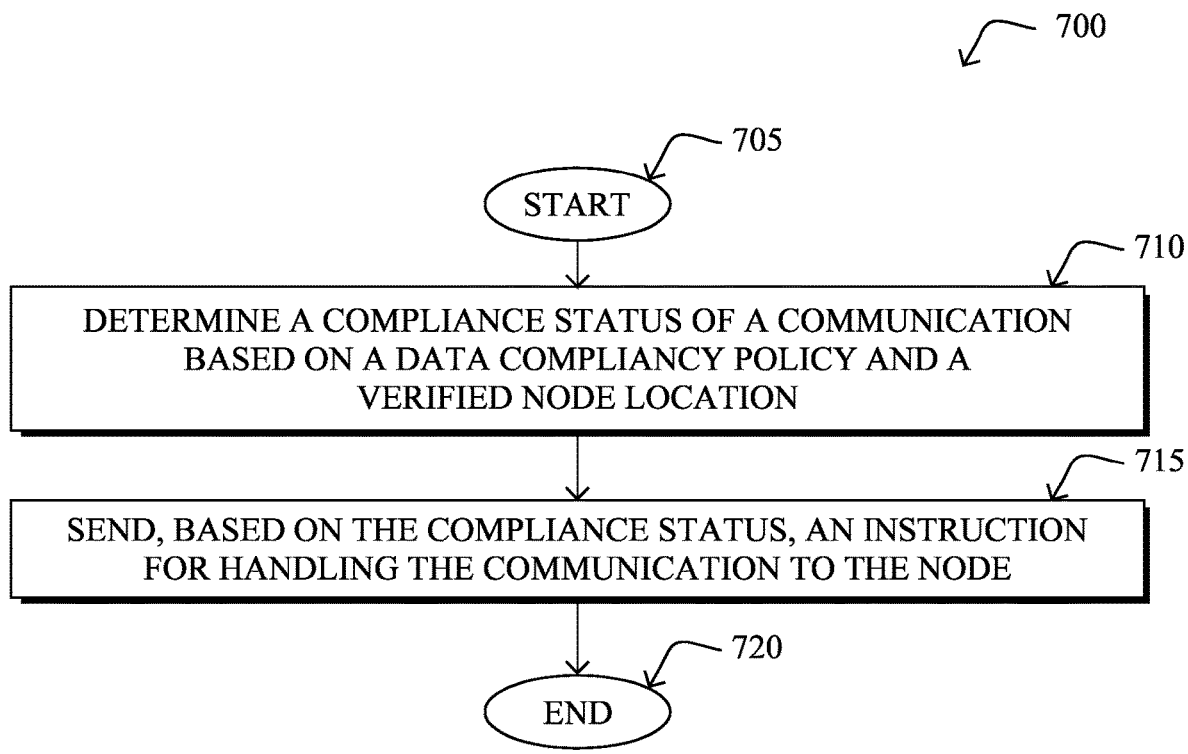
FIG. 7 illustrates an example simplified procedure for performing compliant data transfers.

FIG. 7 illustrates an example simplified procedure (e.g., a method) for performing compliant data transfers, in accordance with one or more embodiments described herein. For example, a non-generic, specifically configured device (e.g., device 200), may perform procedure 700 by executing stored instructions (e.g., data transfer compliance process 248).

The procedure 700 may start at step 705, and continues to step 710, where, as described in greater detail above, a device may determine a compliance status of a communication of a type of data between a first workload and a second workload based on a data compliancy policy and a verified node location of at least one of the first workload and the second workload. The data compliancy policy may specify a geographic location where the type of data may be utilized.

In addition, the device may obtain an association between each of a plurality of workloads of an application service and a corresponding node executing that workload. The device may associate a verified node location to each of the plurality of workloads. The association between each of a plurality of workloads and the corresponding node executing that workload may include a unique ID of an association process that generated the association at the corresponding node. The association between each of a plurality of workloads and the corresponding node executing that workload may include a unique ID of a compliance process to enforce a data compliance policy at the corresponding node. The device may obtain the association between each of a plurality of workloads of the application service and the corresponding node executing that workload from a trusted authority or trusted authority federation.

At step 715, as detailed above, a device may send, based on the compliance status of the communication, an instruction for handling the communication to at least one of a node executing the first workload and a node executing the second workload. The instruction may include an instruction to the compliance process to enforce the data compliance policy for the type of data at the node executing the first workload. The instruction may include an instruction to filter the communication at the node executing the first workload. Additionally, or alternatively, the instruction may include an instruction to log the communication.

In various embodiments, the device may analyze bundles received for the first workload and for the second workload and/or infer a workload mesh from the bundles received for the first workload and for the second workload.

Procedure 700 then ends at step 720.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, may be utilized to provide compliant data transfers. For example, these techniques introduce a mechanism to support trusted binding between authenticated workload IDs and specific infrastructure resources. In addition, these techniques provide a mechanism for provable location of workload IDs that may process, store, retain, and/or distribute data subject to data sovereignty regulations and/or other data compliance constraints. In this manner, the techniques may provide a mechanism for authorization of compliant data transfers across workload IDs, subject to various compliance rules and obligations.

As such, the techniques provide for trustworthy automated data authorization and localization techniques that may be utilized, in combination with DCaC mechanisms, to comply with data regulations. For example, the techniques may provide cross-platform workload identification and authentication mechanisms which are able to incorporate trusted infrastructures and proof of location in a manner that allows a modern application to comply with data regulations.

While there have been shown and described illustrative embodiments that provide compliant data transfers, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a device, a compliance status of a communication of a type of data between a first workload and a second workload based on a data compliancy policy and a verified node location of at least one of the first workload and the second workload; and
   sending, by the device and based on the compliance status of the communication, an instruction for handling the communication to at least one of a node executing the first workload and another node executing the second workload.

2. The method as in claim 1, further comprising:
   obtaining, by the device, an association between each of a plurality of workloads of an application service and a corresponding node executing that workload; and
   associating, by the device, the verified node location to each of the plurality of workloads.

3. The method of claim 2, wherein the association between each of a plurality of workloads and the corresponding node executing that workload includes a unique ID of an association process that generated the association at the corresponding node.

4. The method as in claim 2, wherein the association between each of a plurality of workloads and the corresponding node executing that workload includes a unique ID of a compliance process to enforce the data compliance policy at the corresponding node.

5. The method as in claim 4, wherein the instruction includes an instruction to the compliance process to enforce the data compliance policy for the type of data at the node executing the first workload.

6. The method of claim 2, wherein the device obtains the association between each of a plurality of workloads of the application service and the corresponding node executing that workload from a trusted authority or trusted authority federation.

7. The method as in claim 1, wherein the instruction includes an instruction to filter the communication at the node executing the first workload.

8. The method as in claim 1, wherein the instruction includes an instruction to log the communication.

9. The method as in claim 1, further comprising:
   analyzing, by the device, bundles received by the first workload and by the second workload; and
   inferring a workload mesh from the bundles received by the first workload and by the second workload.

10. The method as in claim 1, wherein the data compliancy policy specifies a geographic location where the type of data may be utilized.

11. An apparatus, comprising:
    one or more network interfaces;
    a processor coupled to the one or more network interfaces and configured to execute one or more processes; and
    a memory configured to store a process that is executable by the processor, the process when executed configured to:
      determine a compliance status of a communication of a type of data between a first workload and a second workload based on a data compliancy policy and a verified node location of at least one of the first workload and the second workload; and
      send, based on the compliance status of the communication, an instruction for handling the communication to at least one of a node executing the first workload and another node executing the second workload.

12. The apparatus as in claim 11, further comprising the process when executed configured to:
    obtain an association between each of a plurality of workloads of an application service and a corresponding node executing that workload; and
    associate the verified node location to each of the plurality of workloads.

13. The apparatus as in claim 12, wherein the association between each of a plurality of workloads and the corresponding node executing that workload includes a unique ID of an association process that generated the association at the corresponding node.

14. The apparatus as in claim 12, wherein the association between each of a plurality of workloads and the corresponding node executing that workload includes a unique ID of a compliance process to enforce the data compliance policy at the corresponding node.

15. The apparatus as in claim 14, wherein the instruction includes an instruction to the compliance process to enforce the data compliance policy for the type of data at the node executing the first workload.

16. The apparatus as in claim 12, wherein the apparatus obtains the association between each of a plurality of workloads of the application service and the corresponding node executing that workload from a trusted authority or trusted authority federation.

17. The apparatus of claim 11, wherein the instruction includes an instruction to filter the communication at the node executing the first workload.

18. The apparatus as in claim 11, wherein the instruction includes an instruction to log the communication.

19. The apparatus as in claim 11 further comprising the process when executed configured to:
   analyze bundles received by the first workload and by the second workload; and
   infer a workload mesh from the bundles received by the first workload and by the second workload.

20. A tangible, non-transitory, computer-readable medium storing program instructions that cause a device to execute a process comprising:
   determining, by the device, a compliance status of a communication of a type of data between a first workload and a second workload based on a data compliancy policy and a verified node location of at least one of the first workload and the second workload; and
   sending, by the device and based on the compliance status of the communication, an instruction for handling the communication to at least one of a node executing the first workload and another node executing the second workload.

* * * * *

UNITED STATES PATENT AND TRADEMARK OFFICE
CERTIFICATE OF CORRECTION

| | | |
|---|---|---|
| PATENT NO. | : 12,225,052 B2 | Page 1 of 1 |
| APPLICATION NO. | : 17/877989 | |
| DATED | : February 11, 2025 | |
| INVENTOR(S) | : Marcelo Yannuzzi et al. | |

It is certified that error appears in the above-identified patent and that said Letters Patent is hereby corrected as shown below:

In the Specification

Column 8, Line 25 please amend as shown:
a type of data between a first workload and a second Column 11, Line 47 please amend as shown:
continuous delivery (CI/CD) pipeline (e.g., at testing, stag- Signed and Sealed this
Twentieth Day of May, 2025

Coke Morgan Stewart
*Acting Director of the United States Patent and Trademark Office*